United States Patent [19]
Yoshida

[11] Patent Number: 6,024,410
[45] Date of Patent: Feb. 15, 2000

[54] DOUBLE-SIDED RECLINING APPARATUS

[75] Inventor: Tomonori Yoshida, Yokohama, Japan

[73] Assignee: Ikeda Bussan Co., Ltd., Ayase, Japan

[21] Appl. No.: 09/129,780

[22] Filed: Aug. 6, 1998

[30] Foreign Application Priority Data

Aug. 8, 1997 [JP] Japan .................................. 9-227526

[51] Int. Cl.⁷ .................................................. B60N 2/20
[52] U.S. Cl. .................. 297/301.1; 297/367; 297/354.1; 297/354.12; 297/366
[58] Field of Search ............................. 297/301.1, 354.1, 297/354.12, 367, 366

[56] References Cited

U.S. PATENT DOCUMENTS

| 5,590,931 | 1/1997 | Fourrey et al. ............... 297/367 X |
| 5,622,407 | 4/1997 | Yamada et al. .............. 297/367 X |
| 5,681,086 | 10/1997 | Baloche ......................... 297/367 |
| 5,727,846 | 3/1998 | Yoshida ................. 297/354.12 X |
| 5,749,624 | 5/1998 | Yoshida ........................ 297/367 |
| 5,755,491 | 5/1998 | Baloche et al. ........... 297/367 X |
| 5,762,400 | 6/1998 | Okazaki et al. ............. 297/367 |
| 5,769,494 | 6/1998 | Barrere et al. ............... 297/367 |
| 5,816,656 | 10/1998 | Hoshihara et al. ......... 297/367 |

FOREIGN PATENT DOCUMENTS

| 63-65327 | 12/1988 | Japan . |
| 7-136032 | 5/1995 | Japan . |
| 9-28496 | 2/1997 | Japan . |
| 9-131237 | 5/1997 | Japan . |

*Primary Examiner*—Peter M. Cuomo
*Assistant Examiner*—Rodney B. White
*Attorney, Agent, or Firm*—Foley & Lardner

[57] ABSTRACT

A double-sided reclining apparatus comprises a first reclining device equipped with a reclining-lever handle and a second reclining device, each comprising a base and an arm having an inner toothed portion, a pivotal shaft through which the arm is rotatably supported on the base, and a set of cam and toothed block in cam-connection. The toothed block has a second toothed portion meshable with and unmeshable from the first toothed portion. The cam and the toothed block cooperate with each other to cause meshing/unmeshing action of the reclining apparatus. The cam and the toothed block have a plurality of cam-connection points in the cam-profile surface of the cam and the cam-contour surface of the toothed block. The pivotal shaft is fitted into a central slot of the cam and has a noncircular irregular-shaped cross section to drive the cam. A predetermined clearance is provided all around between the inner periphery of the central slot of the cam and the outer periphery of the pivotal shaft.

2 Claims, 8 Drawing Sheets

DOUBLE-SIDED RECLINING APPARATUS

BACKGROUND OF THE INVENTION

1. Field of the Invention

The present invention relates to a double-sided reclining apparatus, and more particularly to a rotary-cam type double-sided reclining apparatus in which a pair of reclining devices, mechanically linked to each other, are attached to both sides of an automotive seat, and the locking and unlocking action of each of the reclining device is made by way of a rotary motion of the rotary cam mechanically linked to a reclining lever to ensure the angular adjustment of a seat back relative to a seat cushion.

2. Description of the Prior Art

On earlier model cars, a double-sided seat reclining apparatus is ordinarily used for enhancing a holding performance of a seat back adjusted at a desired angular position and for providing a long-life reclining device. Generally, each reclining device constructing the double-sided reclining apparatus is comprised of a rotary-cam type reclining device which has a base fixedly connected to seat cushion, an arm fixedly connected to a seat back and rotatably supported by the base, at least one toothed block slidably guided in the two opposing parallel side walls in the base, a reclining lever, and a rotary cam which is usually fixedly connected to the pivot shaft of the reclining lever, and which acts to mesh or unmesh the toothed block with or from the inner toothed portion of the arm by way of rotation of the rotary cam. Such conventional double-sided reclining apparatus have been disclosed in Japanese Patent Provisional Publication Nos. 9-28496 and 9-131237, assigned to the assignee of the present invention. The Japanese Patent Provisional Publication No. 9-28496 corresponds to U.S. Pat. No. 5,727,846 issued Mar. 17, 1998 to Tomonori Yoshida. The double-sided reclining apparatus disclosed in the Japanese Patent Provisional Publication No. 9-28496 is characterized by the difference between a cam profile of a rotary cam included in a locking/unlocking mechanism of a first reclining device (corresponding to an outside reclining device employing a reclining-lever handle) and a cam profile of a rotary cam included in a locking/unlocking mechanism of a second reclining device (corresponding to an inside reclining device not employing a reclining-lever handle), thereby permitting a mechanical phase-lead of the inside reclining device with respect to the outside reclining device. This mechanical phase-lead provides a stable reclining action, while insuring a correct feel of the reclining-lever action. Japanese Patent Second Publication No. 63-65327 has disclosed a rotary-cam type reclining device having a rotary cam and a plurality of toothed blocks radially slidable with respect to the pivot shaft of the reclining lever to ensure locking/unlocking action of the reclining device at a desirable adjusted position of the seat back. The Japanese Patent Second Publication No. 63-65327 teaches the provision of a specified clearance between the toothed block and the associated two opposing parallel guiding side walls to ensure a smooth locking/unlocking action of the reclining device, and simultaneously teaches the provision of at least a specified clearance between the cam and the arm to absorb the dimensional error between the rotational axis of the rotary cam fixed to the pivot shaft of the reclining lever and the rotational axis of the arm whose central bore slidably fitted onto the outer periphery of the somewhat axially-extending boss-like portion of the rotary cam. However, in the reclining apparatus disclosed in the Japanese Patent Second Publication No. 63-65327, the boss-like portion of the cam is fixedly connected to the pivot shaft of the reclining lever for example by way of welding, thus resulting in a slight eccentricity between the rotational axis of the cam and the central axis of the pivot shaft. This slight eccentricity would result in undesirable mechanical phase-mismatching between the meshing/unmeshing mechanisms employed in the pair of reclining devices.

Japanese Patent Provisional Publication No. 7-136032 teaches the provision of a clearance between the width-across flatted shaft portion of the pivot shaft and the width-across flatted hole portion of the cam to permit the slight radial motion of the cam in the sliding direction of the toothed block, thus ensuring sufficient cam-connection between the cam-profile surface of the rotary cam and the cam-contour surface of the toothed block with one cam-connection point. However, if the dimensional error exists in a direction perpendicular to the sliding direction, it is impossible to accurately self-align or match the rotational axis of the rotary cam with respect to the center axis of the pivot shaft. Such a dimensional error may produce inadequate cam-connection between the cam-profile surface of the rotary cam and the cam-contour surface of the toothed block, and prevent the toothed portion of the toothed block from being smoothly brought into meshed-engagement with the inner toothed portion of the arm.

SUMMARY OF THE INVENTION

Accordingly, it is an object of the invention to provide a double-sided reclining apparatus which avoids the aforementioned disadvantages of the prior art.

In order to accomplish the aforementioned and other objects of the present invention, a double-sided reclining apparatus comprises a first reclining device equipped with a reclining-lever handle and a second reclining device, each comprising a base adapted to be fixedly connected to a seat cushion, an arm adapted to be fixedly connected to a seat back and having a first toothed portion, a pivotal shaft through which the arm is rotatably supported on the base, and, a set of cam and toothed block in cam-connection with each other, the toothed block having a second toothed portion meshable with and unmeshable from the first toothed portion, the cam and the toothed block cooperating with each other for causing meshed-engagement of the second toothed portion with the first toothed portion through a rotary motion of the cam in a first rotational direction to lock the reclining device, and for causing disengagement of the second toothed portion from the first toothed portion through a rotary motion of the cam in a second rotational direction opposed to the first rotational direction to unlock the reclining device, the cam and the toothed block have a plurality of cam-connection points in a cam-profile surface of the cam and a cam-contour surface of the toothed block, and a connecting member through which the cam included in the first reclining device is mechanically linked to the cam included in the second reclining device, wherein the pivotal shaft is fitted into a central slot of the cam and has a noncircular irregular-shaped cross section to drive the cam, and a predetermined clearance is provided all around between an inner periphery of the central slot of the cam and an outer periphery of the pivotal shaft.

According to another aspect of the invention, a double-sided reclining apparatus, comprises a first reclining device equipped with a reclining-lever handle and a second reclining device, each comprising a base adapted to be fixedly connected to a seat cushion and defining therein a recessed toothed-block guide having a pair of parallel side walls, an arm adapted to be fixedly connected to a seat back and having a first toothed portion, and a pivotal shaft through which the arm is rotatably supported on the base, a set of cam and toothed block in cam-connection with each other, the toothed block slidably disposed between the base and the arm, and having a second toothed portion on an outer periphery thereof and a cam-contour surface on an inner periphery thereof, so that the second toothed portion is meshable with and unmeshable from the first toothed portion, while being slidably guided by the side walls of the recessed toothed-block guide, the cam and the toothed block cooperating with each other for causing meshed-engagement of the second toothed portion with the first toothed portion through a rotary motion of the cam in a first rotational direction to lock the reclining device, and for causing disengagement of the second toothed portion from the first toothed portion through a rotary motion of the cam in a second rotational direction opposed to the first rotational direction to unlock the reclining device, and the cam having a cam-profile surface facing the cam-contour surface of the toothed block, the cam and the toothed block have a plurality of cam-connection points in the cam-profile surface and the cam-contour surface for restricting a sliding motion of the toothed block in a sliding direction parallel to the side walls and for restricting a movement of the toothed block in a direction perpendicular to the sliding direction, when the toothed block is kept at an outermost sliding position where the second toothed portion is completely meshed with the first toothed portion, and a connecting member through which the cam included in the first reclining device is mechanically linked to the cam included in the second reclining device, wherein the pivotal shaft is fitted into a central slot of the cam and has a noncircular irregular-shaped cross section to drive the cam, and a predetermined clearance is provided all around between an inner periphery of the central slot of the cam and an outer periphery of the pivotal shaft.

It is preferable that the pivot shaft has a width-across-flat shaft portion formed by a pair of diametrically-opposing circular-arc faces and a pair of rectangular parallel flat faces, and the central slot of the cam is formed as a width-across-flat hole portion which is contoured to be loosely fitted onto the width-across-flat shaft portion of the pivotal shaft, to create the noncircular irregular-shaped cross section and to provide the predetermined clearance. Alternatively, the pivotal shaft included in the first reclining device, the pivotal shaft included in the second reclining device, and the connecting member may be integrally formed as a sole pivotal member in common to the first and second reclining devices. The sole pivotal member may be formed on its outer periphery with a plurality of longitudinally-extending ridged portions to create the noncircular irregular-shaped cross section, and the central slot of the cam has a plurality of key-grooved portions loosely fitted onto the respective longitudinally-extending ridged portions to provide the predetermined clearance. The sole pivotal member may have a substantially flower-like hollow cross section being same over its entire length.

DESCRIPTION OF THE PREFERRED EMBODIMENTS

Figure 1:
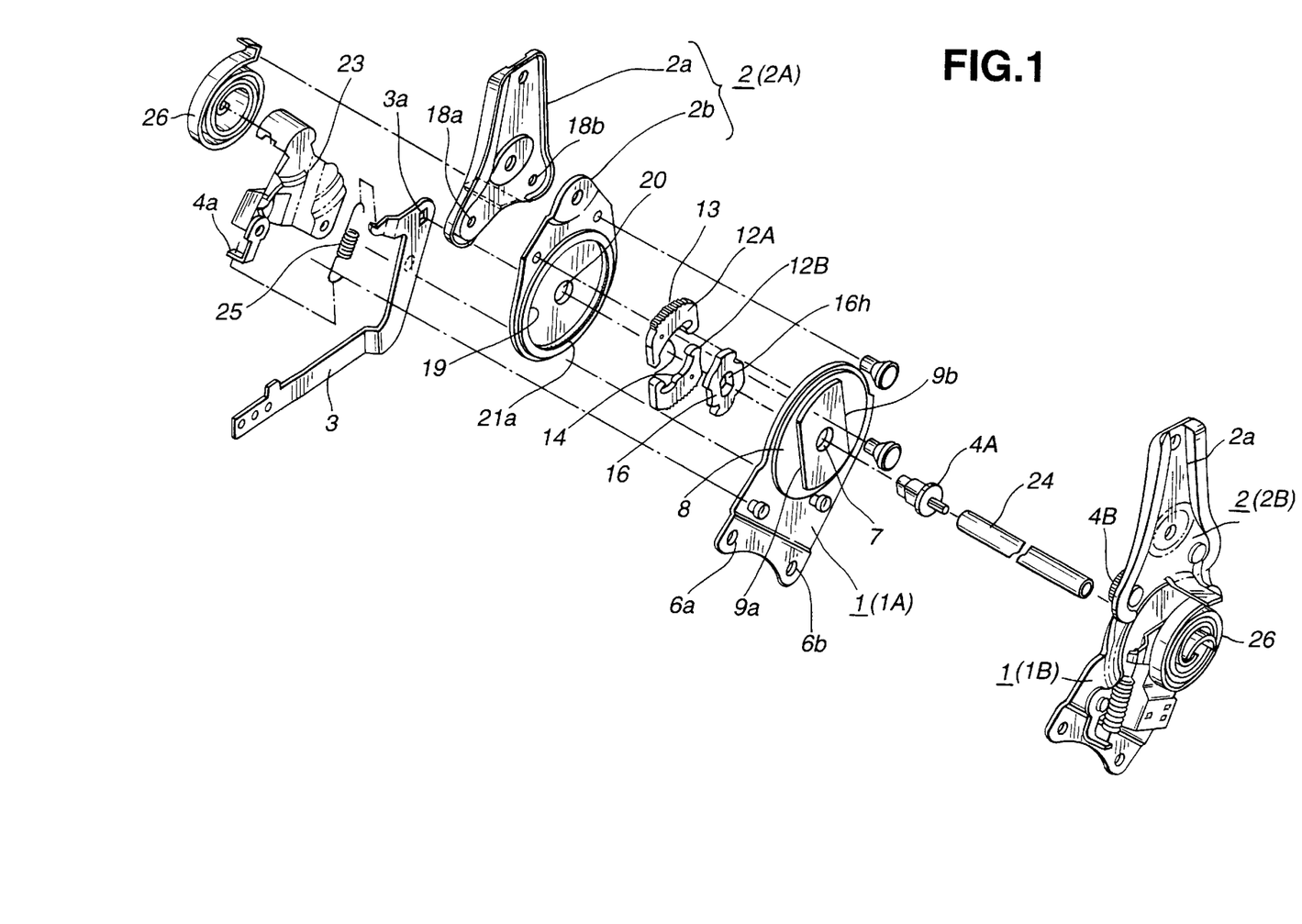
FIG. 1 is a disassembled view illustrating one embodiment of a double-sided reclining apparatus according to the invention.
Figure 2:
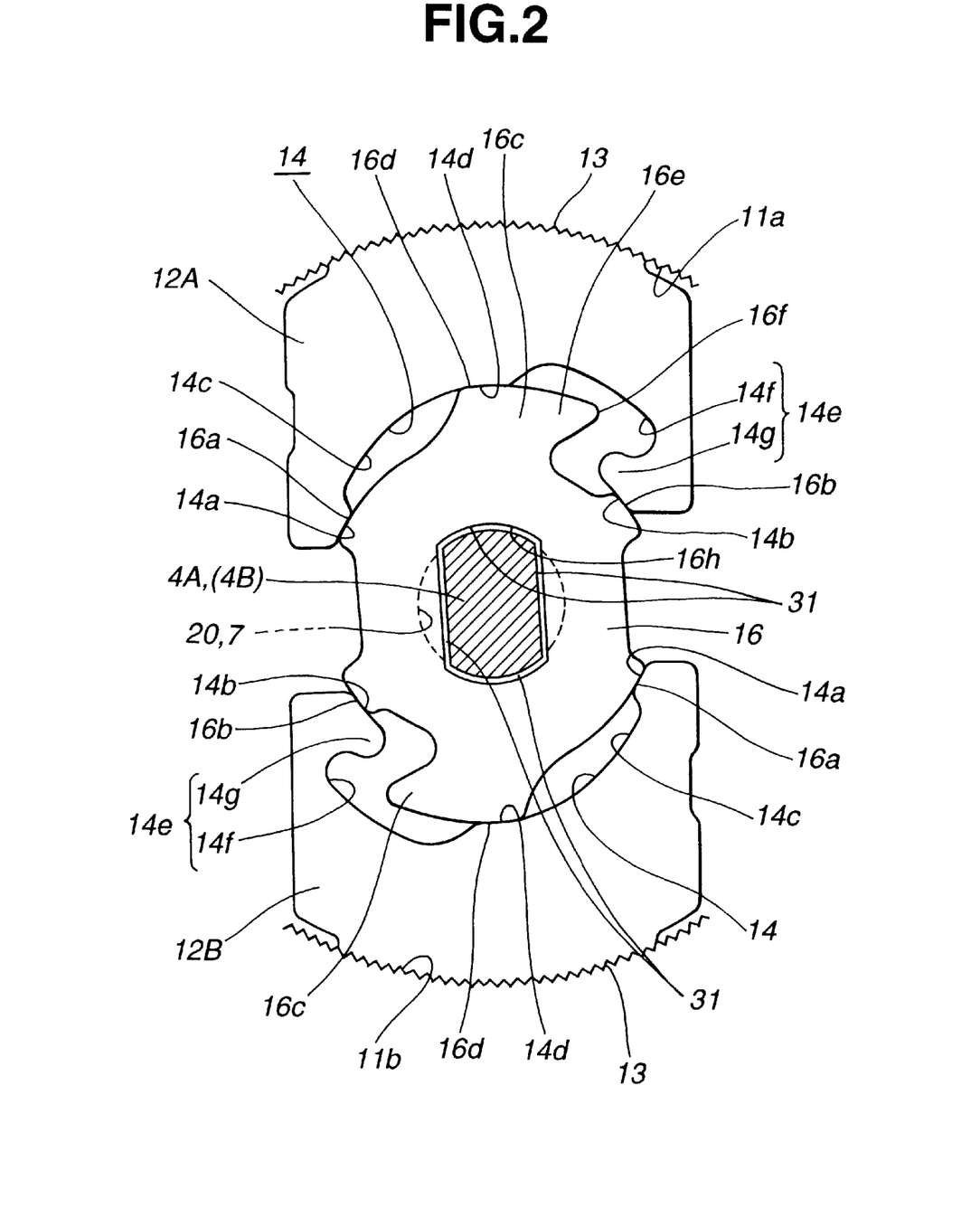
FIG. 2 is an enlarged view illustrating the essential portion of the reclining device of the embodiment.
Figure 3:
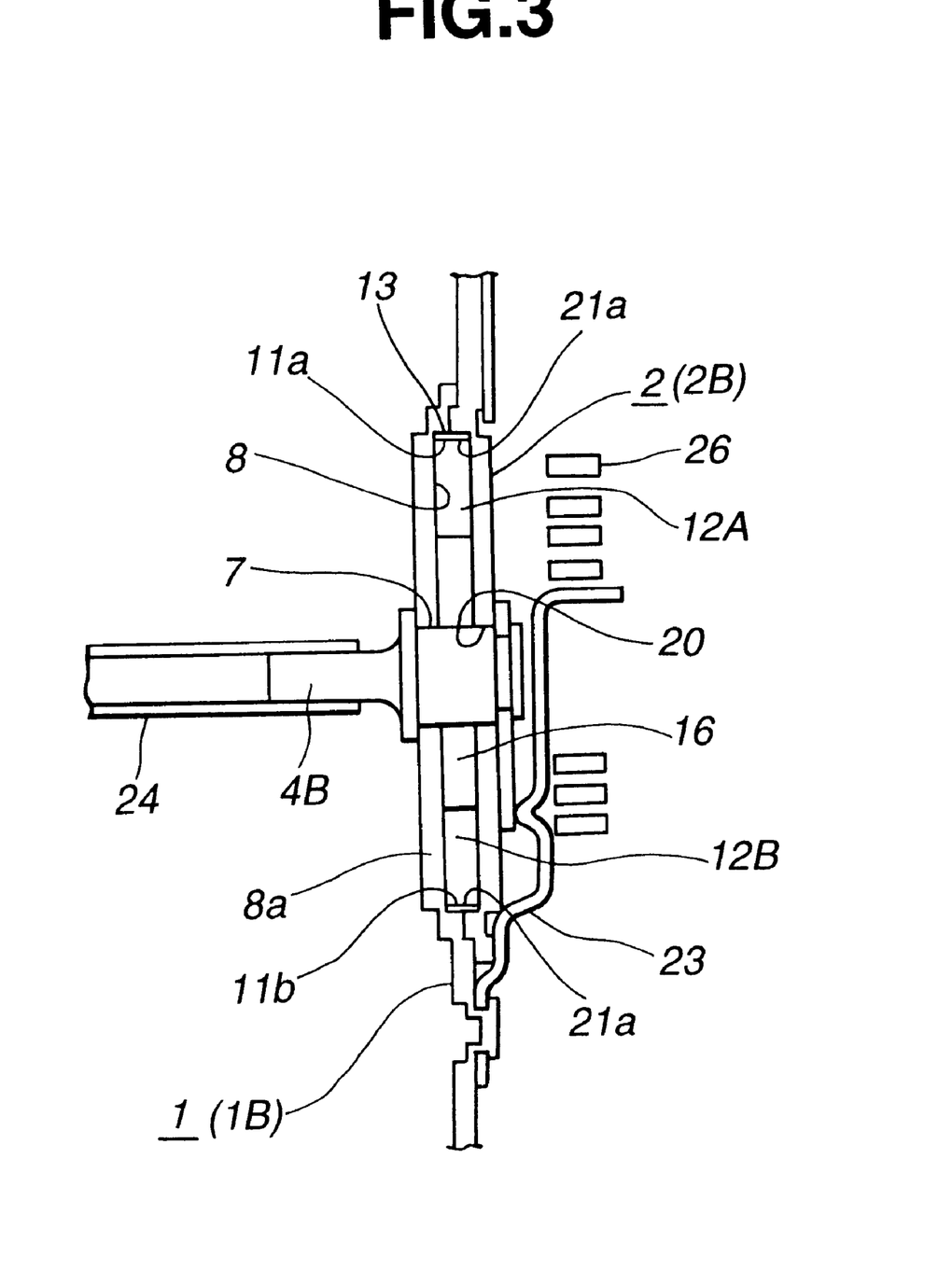
FIG. 3 is a longitudinal cross-sectional view illustrating one reclining device (the inside reclining device not including the reclining lever) of the double-sided reclining apparatus of the embodiment.
Figure 4:
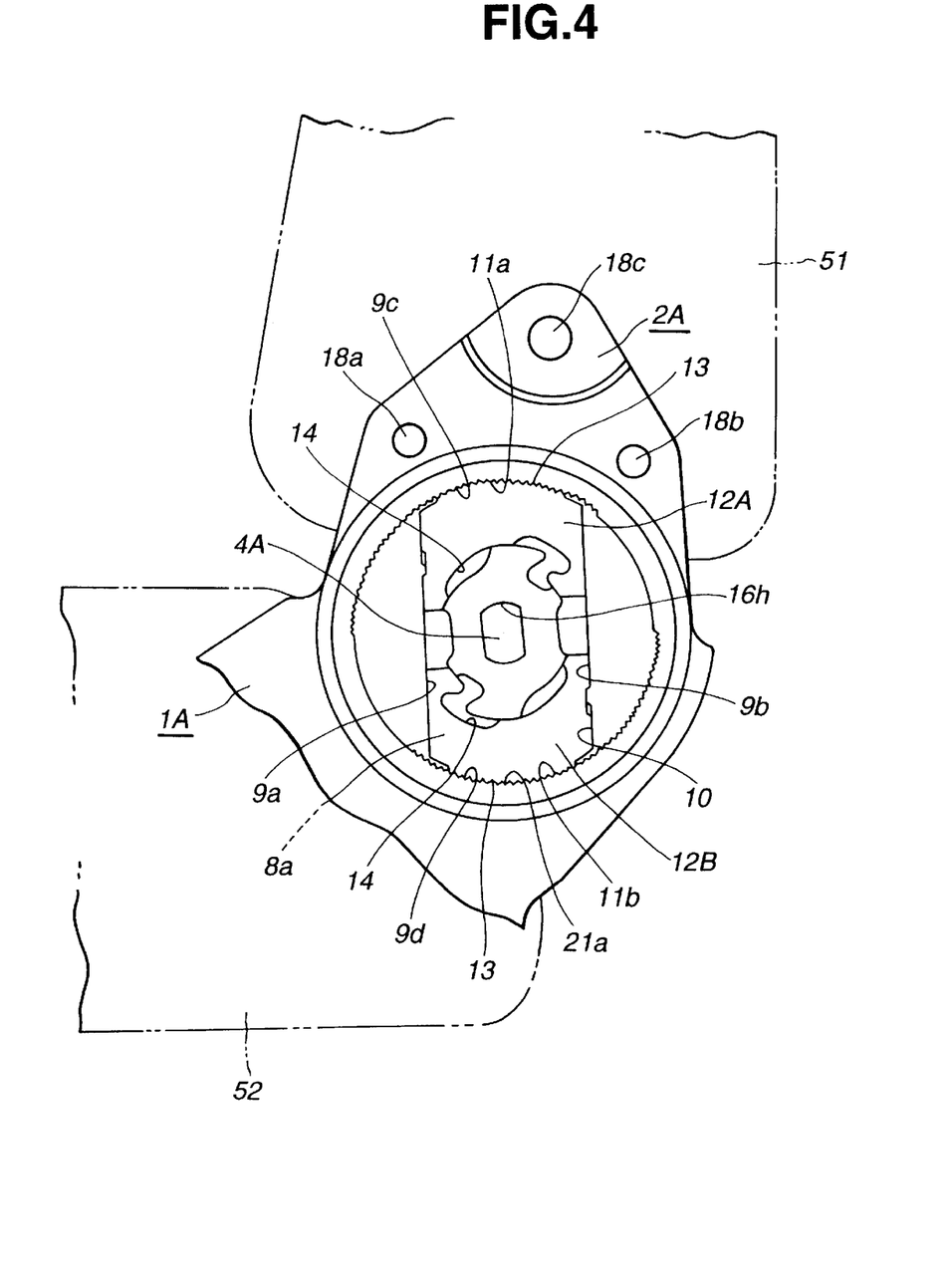
FIG. 4 is an explanatory view illustrating one engaged state of a rotary cam and a toothed-block pair in cam-connection and a locked state of the reclining device with the toothed block pair meshed with the arm.
Figure 5:
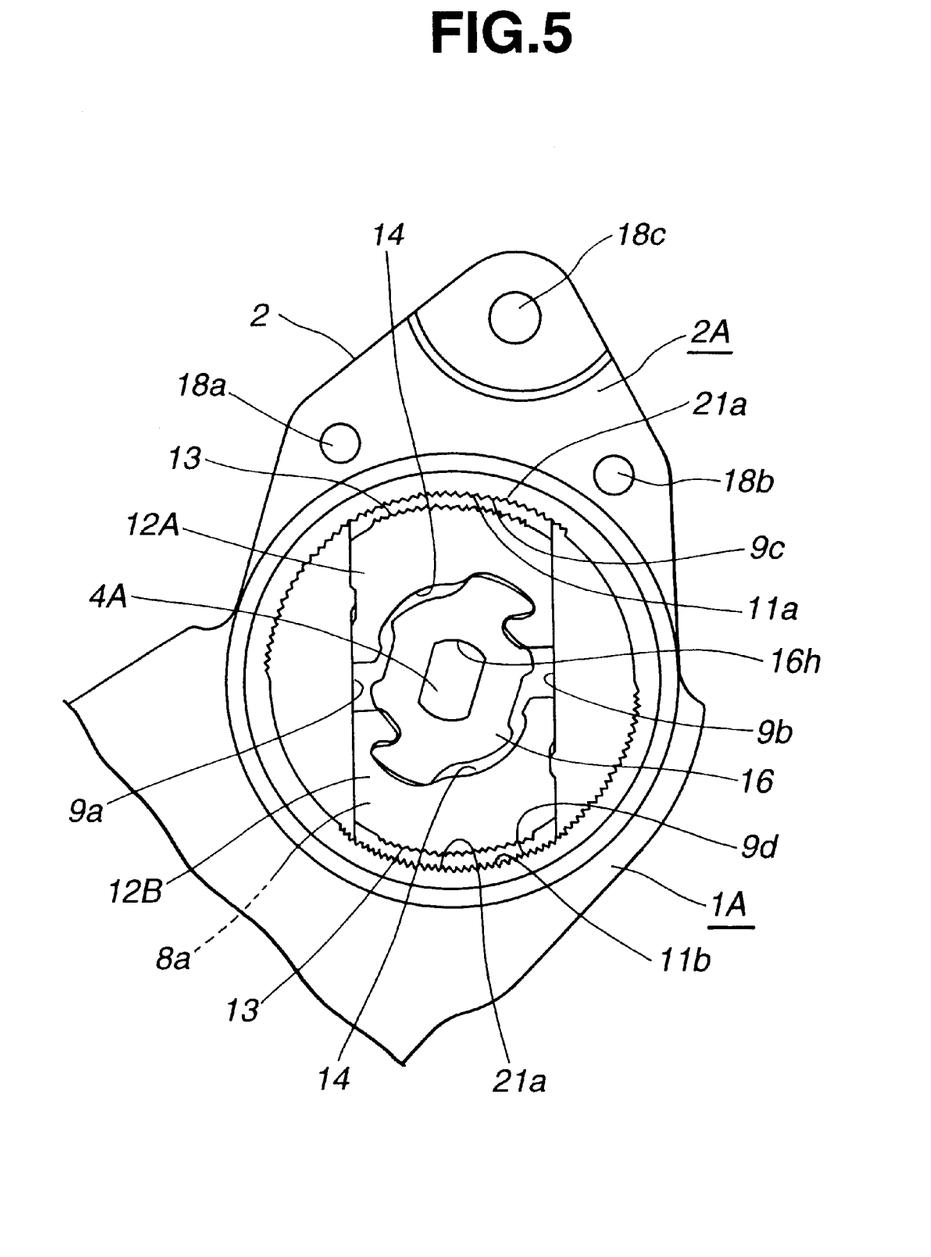
FIG. 5 is an explanatory view illustrating another engaged state of the rotary cam and the toothed-block pair in cam-connection and an unlocked state of the reclining device with the toothed block pair unmeshed from the arm.

Referring now to the drawings, particularly to FIGS. 1 though 5, there is shown a double-sided seat reclining apparatus having a pair of rotary-cam type reclining devices. In FIG. 1, the right-hand reclining device not including a reclining-lever handle (simply a reclining lever) 3, corresponds to an inside reclining device attached to the inside of a seat cushion 52 (see FIG. 4) by means of a base 1B. The left-hand reclining device including the reclining lever 3, corresponds to an outside reclining device attached to the outside of the seat cushion 52 by means of a base 1A. In the drawings, the character "A" attached to the left-hand side of reference numeral means an "outside", whereas the character "B" attached to the right-hand side of reference numeral means an "inside". The outside reclining device has an outside rotatable arm 2A fixedly connected to the outside of a seat back 51 (see FIG. 4) and rotatably mounted on an outside pivotal shaft 4A to which the reclining lever 3 is fixedly connected. On the other hand, the inside reclining device has an inside rotatable arm 2B fixedly connected to the inside of the seat back 51 and rotatably mounted on an inside pivotal shaft 4B. The two pivotal shafts 4A and 4B are fixedly connected to each other through a connecting pipe 24 by way of serration connection or spline connection. As seen in FIG. 1, the inside base 1B is the mirror image of the outside base 1A. Each of the bases 1A and 1B is formed with a plurality of mounting-bolt holes 6a and 6b for firmly securing the base 1A and 1B to the seat-cushion frame by way of bolts, rivets, or the like. Each of the bases (1A; 1B) is formed with a circular recessed portion 8 having a central bore 7 into which the associated pivotal shaft (4A; 4B) is rotatably fitted. As best seen in FIGS. 4 and 5, a substantially rectangular recessed toothed-block guide 10 is formed essentially midway of the flat bottom plate 8a (see FIGS. 3, 4 and 5). The recessed toothed-block guide 10 has a pair of diametrically-opposing elongated side walls 9a and 9b, an upper circular-arc shaped side wall 9c being continuous with upper ends of the side walls 9a and 9b, and a lower circular-arc shaped side wall 9d being continuous with lower ends of the side walls 9a and 9b. As seen in FIGS. 4 and 5, the upper circular-arc shaped side wall 9c is formed with an inner toothed portion 11a which is meshable with the outer toothed portion 13 of the upper toothed block 12A, whereas the lower circular-arc shaped side wall 9d is formed with an inner toothed portion 11b which is meshable with the outer toothed portion 13 of the lower toothed block 12B. The upper and lower toothed blocks 12A and 12B are guided within the recessed toothed-block guide 10 radially slidably by way of the guide side walls 9a and 9b. In addition to the outer toothed portion 13, each of the toothed blocks 12A and 12B has a cam-contour surface generally denoted by 14. The cam-contour surface 14 is composed of a plurality of complicated cam-contour surface portions 14a to 14e, as will be fully described later. As seen in FIG. 2, when the rotary cam 16 and the toothed block pair (12A; 12B) are assembled within the recessed toothed-block guide 10 of the base 1, the cam-contour surface of the upper toothed block 12A and the cam-contour surface of the lower toothed block 12B are point-symmetrical with respect to the axis of the pivotal shaft 4 (or the axis of the central bore 7). As seen in FIG. 2, the cam-contour surface of the toothed block (12A; 12B) is comprised of a substantially 45° up-sloped, raised, curved edge portion 14a (see the rightmost end of the lower toothed block 12B of FIG. 2), a substantially 45° down-sloped, raised curved edge portion 14b (see the leftmost end of the lower toothed block 12B of FIG. 2), a first curved groove-cut portion 14c being continuous with the up-sloped raised edge portion 14a, a horizontally-extending moderately-curved intermediate portion 14d being continuous with the first curved groove-cut portion 14c and having a radius of curvature greater than the respective curved edged portion (14a; 14b), and a second curved groove-cut portion 14e being formed between the down-sloped raised curved edge portion 14b and the moderately-curved intermediate portion 14d. The intermediate portion 14d is used for the locking action of the reclining device, whereas the second groove-cut portion 14e is used for the unlocking action of the reclining device. Therefore, the intermediate portion 14d will be hereinafter referred to as a "locking-action cam-contour surface portion", whereas the second groove-cut portion 14e will be hereinafter referred to as an "unlocking-action camcontour surface portion". More precisely, the unlocking-action cam-contour surface portion 14e consists of a groove cut portion 14f being continuous with the locking-action cam-contour surface portion 14d and a finger-tip like cam-edge portion 14g. The rotary cam 16 is formed with a pair of diametrically-opposing cam-profile surfaces on its outer periphery, such that the upper cam-profile surface of the rotary cam and the cam-contour surface of the upper toothed block 12A are brought into cam-connection, while the lower cam-profile surface of the rotary cam and the cam-contour surface of the lower toothed block 12B are brought into cam-connection. As seen in FIG. 2, each cam-profile surface of the rotary cam 16 comprises a first sloped cam-edge portion 16a (see the rightmost end of the rotary cam 16 of FIG. 2) abuttable with the substantially 45° up-sloped, raised, curved edge portion 14a, a second sloped cam-edge portion 16b (see the leftmost end of the rotary cam 16 of FIG. 2) abuttable with the substantially 45° down-sloped, raised curved edge portion 14b, an undulated intermediate portion 16c being formed between the first and second sloped cam-edge portions 16a and 16b. The intermediate portion 16c comprises a slightly-raised intermediate cam-edge portion 16d abuttable with the locking-action cam-contour surface portion 14d, a finger-tip like cam-edge portion 16e being continuous with the intermediate cam-edge portion 16d, and a curved groove-cut portion 16f formed between the second sloped cam-edge portion 16b and the finger-tip like cam-edge portion 16e and abuttable with the finger-tip like cam-edge portion 14g of the unlocking-action cam-contour surface portion 14e. As appreciated from the hatched cross-section of FIG. 2, the pivotal shaft 4 has a noncircular irregular-shaped shaft portion, that is, a width-across-flat shaft portion formed by a pair of diametrically-opposing circular-arc faces and a pair of rectangular parallel flat faces. Each of the circular-arc faces serves as a sliding surface which is slidably fitted to the inner peripheral surface of the central bore 20 of the lower arm member 2b of the arm 2. As described in detail hereunder, the noncircular irregular-shaped cross section of the pivotal shaft 4 permits the cam 16 to be driven in synchronization with the rotary motion of the reclining lever fixedly connected to the end of the pivot shaft. For co-rotation with the pivotal shaft 4 of the reclining lever 3, the rotary cam 16 has a substantially rectangular central slot or hole 16h fitted onto the width-across flatted shaft portion of the pivotal shaft 4. The substantially rectangular slot 16h of the cam 16 is contoured in such a manner as to be somewhat loosely fitted onto the width-across flatted shaft portion of the pivotal shaft 4, as fully discussed later. Returning to FIGS. 1 and 3, the arm 2 is comprised of upper and lower arm members 2a and 2b. The upper arm member of the arm 2 is formed with a plurality of mounting-bolt holes 18a, 18b, and 18c, for firmly securing the arm to the seat back 51. The lower arm member of the arm 2 is formed integral with a ring-gear like portion 19 having a pair of diametrically-opposing circular-arc shaped inner toothed portions (21a; 21a), which are point-symmetrical with respect to the axis of the pivotal shaft 4. When assembling, the pair of the toothed blocks 12A and 12B are radially slidably accommodated in the internal space defined between the ring-gear like portion 19 of the arm 2 and the recessed toothed-block guide 10, so that the outer toothed portion 13 of each toothed block (12A; 12B) is meshable with the associated inner toothed portion 21a of the arm 2, and so that the rotary cam 16 is rotatably accommodated between the toothed blocks 12A and 12B. The ring-gear like portion 19 is so designed to have an inner diameter identical to the inner diameter of the upper and lower diametrically-opposing circular-arc shaped side walls 9c and 9d. The central bore 20 is formed by boring the central arm portion corresponding to the center of the ring-gear like portion 19. In the shown embodiment, although the arm 2 is formed by integrally connecting the upper and lower arm members 2a and 2b, the arm may be integrally formed as a sole arm member. As seen in FIG. 1, the base (1A; 1B) and the arm (2A; 2B) are integrally connected to each other by caulking the free end of the pivotal shaft 4 from the outside of the reclining device, under a condition where the pivotal shaft (4A; 4B), having a width-across flatted shaft portion, is inserted into the bore 7 of the base (1A; 1B), the hole 16h of the cam 16, the central bore 20 of the arm (2A; 2B), and the width-across-flat hole portion 3a of the reclining lever 3. The inside pivot shaft assembly 4B is formed with an armed portion as well as the inside pivot shaft portion. On the other hand, the outside pivot shaft assembly 4A is formed with an armed portion as well as the reclining lever 3 and the outside pivot shaft portion. The armed portion of each of the pivot shaft assembly has a spring slot (not numbered) at which one hooked end of a return spring 25, such as a coiled tension spring, is hanged. The other hooked end of the return spring 25 is hanged at a bracket 4a of a holder 23, fixedly connected to the associated base, usually by way of riveting. Thus, the operating lever (or the pivotal shaft 4) is biased to its initial position or a spring-biased position by way of the bias of the return spring 25. The holder 23 is further formed integral with a curved stopper portion (not numbered) engaged with the innermost central end of a return spring 26, such as a spiral spring. The outermost curled end of the return spring 26 is engaged with the projected stopper portion (not numbered) of the arm 2. With the previously-noted arrangement, the seat back 51, fixedly connected to the arm, is permanently forced to tilt forwards by means of the bias of the return spring 26 under the unlocked condition of the reclining device. As discussed above, in the reclining apparatus of the embodiment, the cross-section of the fitting portion of the pivotal shaft (4A; 4B) to the hole 16h of the cam (16A; 16B) is formed as a noncircular irregular-shaped cross section. In the first embodiment shown in FIGS. 2–5, the fitting portion of the pivotal shaft (4A; 4B) is formed as a width-across-flat shaft portion constructed by a pair of diametrically-opposing circular-arc outer faces and a pair of rectangular parallel flat outer faces. As regards the fitted portion of the cam 16, the slot 16h of the cam is contoured in such a manner as to be properly loosely fitted onto the fitting portion of the pivotal shaft (4A; 4B) having the width-across-flat shaft portion. Therefore, the slot 16h of the cam 16 is formed as a width-across-flat slot portion constructed by a pair of diametrically-opposing circular-arc inner faces and a pair of rectangular parallel flat inner faces. As seen in FIG. 2, the radius of curvature of the circular-arc shaped outer face of the pivotal shaft 4 is slightly smaller than the radius of curvature of the circular-arc shaped inner face of the slot 16h of the cam 16 by a predetermined clearance 31. Additionally, the width between the two parallel rectangular flat outer faces of the fitting portion of the pivotal shaft 4 is slightly smaller than the width between the two parallel rectangular flat inner faces of the fitted portion of the slot 16h of the cam 16 by the same clearance 31. Thus, at the loosely-fitted portion of the pivotal shaft 4 and the rotary cam 16, there is the predetermined clearance 31 all around (in all directions with respect to the rotational axis of the rotary cam 16) between the inner periphery of the central slot 16h and the outer periphery of the pivotal shaft. Thus, when the left and right reclining devices of the double-sided reclining apparatus are operated after assembled, the predetermined clearance 31 provided all around serves to effectively accurately self-align or match the rotational axis of the cam 16 with respect to the center axis of the pivotal shaft 4. In other words, the predetermined clearance 31 provided all around between the inner periphery of the cam and the outer periphery of the pivotal shaft 4 can effectively absorb several dimensional errors and assembling errors of the component parts constructing the left and right reclining devices, thus insuring enhanced mechanical phase matching between the meshing/unmeshing mechanisms employed in the double-sided reclining apparatus.

Figure 6:
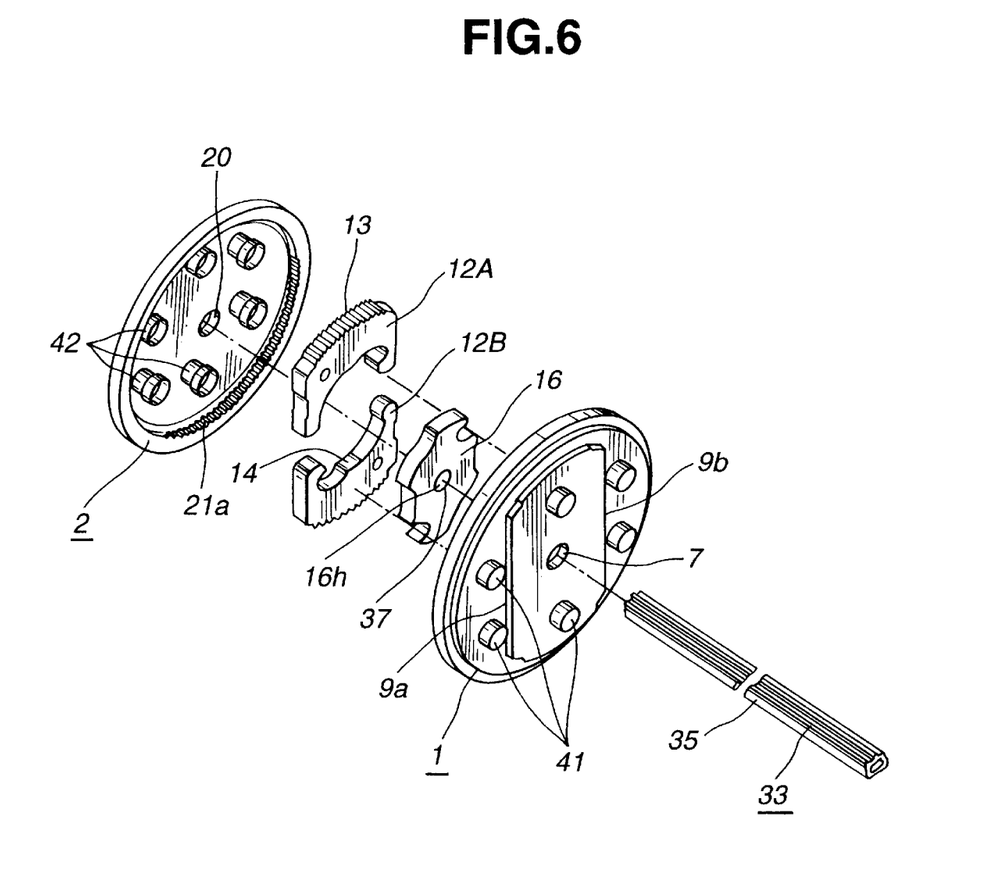
FIG. 6 is a disassembled view illustrating the other embodiment of a double-sided reclining apparatus according to the invention.
Figure 7:
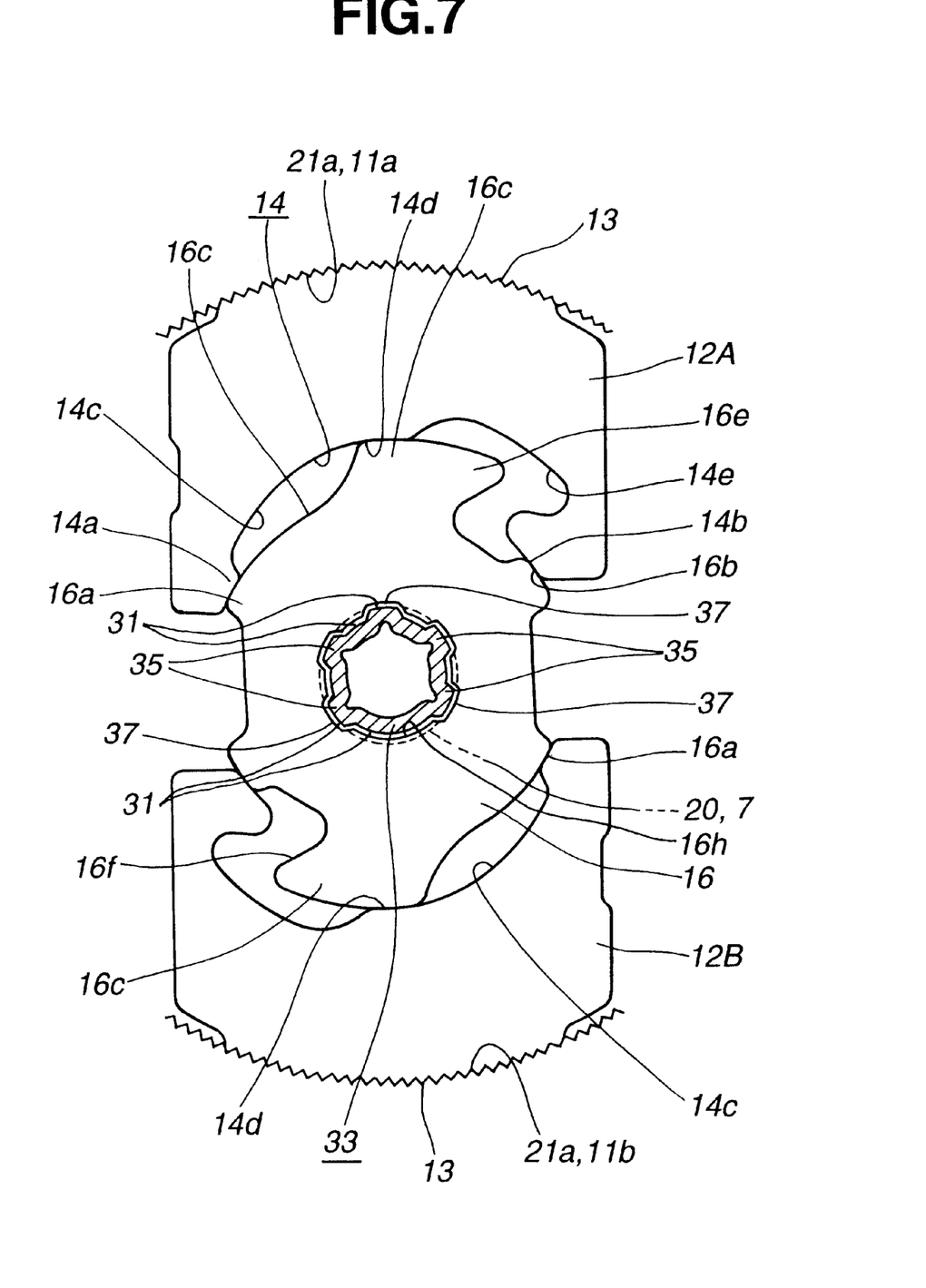
FIG. 7 is an enlarged view illustrating the essential portion of the reclining device of the other embodiment shown in FIG. 6.
Figure 8:
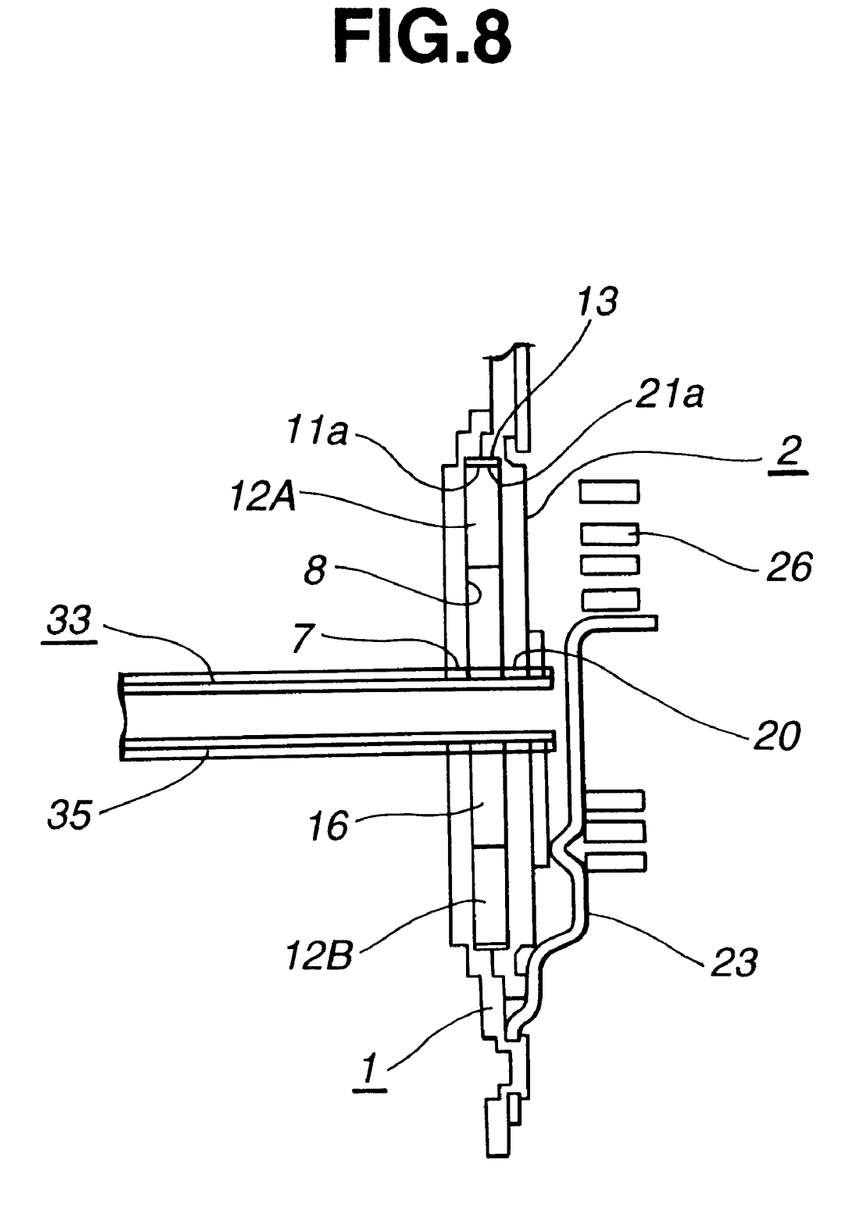
FIG. 8 is a longitudinal cross-sectional view illustrating one reclining device (the inside reclining device not including the reclining lever) of the double-sided reclining apparatus of the embodiment shown in FIGS. 6 and 7.

Referring now to FIGS. 6 to 8, there is shown the other embodiment of a double-sided reclining apparatus. The reclining apparatus of the second embodiment shown in FIGS. 6–8 is different from the first embodiment shown in FIGS. 1–5, in that the first pivotal shaft contained in the inside reclining device adapted to face to a center line of an automotive vehicle, the second pivotal shaft contained in the outside reclining device equipped with the reclining-lever handle and adapted to face apart from the center line of the automotive vehicle, and the connecting pipe or rod interconnecting the first and second pivotal shafts are integrally formed as a tube-like pivotal member 33 having a noncircular irregular-shaped cross section, such as a substantially flower-like hollow cross section. For the purpose of comparison between the first embodiment shown in FIGS. 1–5 and the second embodiment shown in FIGS. 6–8, the same reference numerals used to designate elements in the apparatus shown in FIGS. 1–5 will be applied to the corresponding elements used in the second embodiment shown in FIGS. 6–8. As can be appreciated from FIGS. 6–8, specifically from FIG. 6, the rotary cam 16B of the inside reclining device and the rotary cam 16A of the outside reclining device are mechanically linked to each other through the tube-like pivotal member 33 formed as a sole pivotal member. In the second embodiment, the tube-like pivotal member 33 fitted to both the cams 16A and 16B has a noncircular irregular-shaped cross section, just like a substantially flower-like tube. To create the noncircular irregular-shaped cross section, the tube-like pivotal member 33 is formed on its outer periphery with a plurality of longitudinally-extending ridged portions 35. The tube-like pivotal member 33 has the same cross-section over its entire length. As compared with the pivotal shaft assembly consisting of the two pivotal shafts 4A and 4B and the connecting pipe 24, the structure of the tube-like pivotal member 33, formed as a single pivotal member in common to the left and right reclining devices, is simple. The previously-noted ridged portions 35 of each end of the tube-like pivotal member 33 are loosely fitted to or engaged with the respective key-grooved portions 37 formed on the inner periphery of the slot 16h of each of the cams 16A and 16B. Both ends of the tube-like pivotal member 33 serve as the pivotal shaft for the arms 2A and 2B, as well as the drive shaft for the cams 16A and 16B. Also, one outermost end of the tube-like pivotal member 33 is fixedly connected to the reclining-lever handle for co-rotation with the operating lever 3. The bore 7 of the base (1A; 1B) and the bore 20 of the arm (2A; 2B) are rotatably fitted onto the outer peripheries of the plural longitudinally-extending ridged portions 35 of the tube-like pivotal member 33, so as to permit rotation of the pivotal member 33 relative to the base (1A; 1B) and rotation of the arm (2A; 2B) relative to the pivotal member 33. As set forth above, the longitudinally-extending ridged portions 35 are fitted to or engaged with the respective key-grooved portions 37 formed on the inner periphery each of the cams 16A and 16B, and thus the rotational motion of the tube-like pivotal member 33 is reliably transmitted to both the cams 16A and 16B. As seen in FIG. 6, the base (1A; 1B) of the reclining device of the second embodiment is substantially circular in shape and is formed with a plurality of fitting portions 41 projected toward the upper slide rail (or the seat cushion frame), so that the base 1 is fixedly connected to the seat-cushion sub-assembly by fitting these fitting portions 41 into the respective fitted hole bored in the seat-cushion sub-assembly. Similarly, the arm (2A; 2B) of the reclining device of the second embodiment is substantially circular in shape and is formed with a plurality of fitting portions 42 projected toward the seat-back frame, so that the arm 2 is fixedly connected to the seat-back frame member by fitting the fitting portions 42 into the respective fitted hole bored in the set-back frame member. The other structure of the second embodiment is similar to that of the first embodiment. In the second embodiment, the tube-like pivotal member 33 which has a noncircular irregular-shaped cross section, such as a substantially flower-like hollow cross section, and which is formed as a sole pivotal member in common to the left and right reclining devices, eliminates the necessity for a connecting rod or pipe 24 interconnecting the left and right pivotal shafts for the left and right reclining devices. Thus, the number of component parts of the double-sided reclining apparatus can be reduced. Also, the use of the tube-like pivotal member 33 which is formed as a sole pivotal member, and which functions as a drive shaft for both the left and right cams, enhances the accuracy of alignment among the rotational axes of the inside and outside rotary cams 16B and 16A, the rotational axes of the inside and outside arms 2B and 2A, and the central axes of the bores (7, 7) of the inside and outside bases 1B and 1A. In the same manner as the first embodiment, the reclining apparatus of the second embodiment has the predetermined clearance 31 all around (in all directions with respect to the rotational axis of the rotary cam 16) at the loosely-fitted portion of the tube-like pivotal member 33 and the rotary cam 16. With the double-sided reclining apparatus assembled, during operation of the reclining devices, the predetermined clearance 31, which is provided all around the inner periphery of the cam, can effectively absorb several dimensional errors and assembling errors of the component parts constructing the left and right reclining devices, thus enhancing mechanical phase matching between the meshing/unmeshing mechanisms employed in the double-sided reclining apparatus. As best seen in FIGS. 2 and 7, in the double-sided reclining apparatus of the first and second embodiments, each of the left and right rotary-cam type reclining devices has a toothed block (12A; 12B) with a cam-contour surface on its inner periphery, and a rotary cam (16A; 16B) having a cam-profile surface which faces the cam-contour surface, and which contacts the cam-contour surface with a plurality of cam-connection points, so as to ensure a higher mechanical strength of the reclining device and to reliably restrict the sliding motion of the toothed block when the device is in its locking state. In the shown embodiments, the cam-profile surface of the rotary cam 16 is able to contact the cam-contour surface of the toothed block (12A; 12B) with three cam-connection points. Such a locking/unlocking mechanism having a plurality of cam-connection points, can satisfactorily restrict the sliding motion of the toothed blocks 12A and 12B in a sliding direction parallel to the side walls of the recessed toothed block guide formed in the base and satisfactorily restrict the movement of the toothed blocks in a direction perpendicular to the sliding direction, when the toothed blocks are kept at their outermost sliding positions where the outer toothed portions of the toothed blocks are completely meshed with the associated inner toothed portions of the arm. Therefore, when the locking/unlocking mechanism is brought into the locked state with a plurality of cam-connection points with a rotary motion of the cam 16, the predetermined clearance 31 allows the self-aligning motion of the cam 16 with respect to the pivotal shaft 4 (or the tube-like pivotal member 33) in all directions to avoid cam-connection failure of the intended cam-connection points. As discussed above, the predetermined clearance 31, provided all around, is very advantageous and effective to compensate for several dimensional errors and assembling errors, thus assuring contact between the cam-profile surface of the cam 16 and the cam-contour surface of the toothed block (12A; 12B) at all of the plurality of cam-connection points. This ensures smooth locking/unlocking action of the left and right reclining devices, and also allows proper mechanical phase-matching between the meshing/unmeshing mechanisms employed in the reclining devices. Additionally, in the double-sided reclining apparatus of the second embodiment, the tube-like pivotal member 33 functions as a pivotal shaft for both the inside and outside arms and the inside and outside bases, as well as a drive shaft for both the inside and outside rotary cams, thus reducing the number of component parts of the double-sided reclining apparatus.

The double-sided reclining apparatus of the first and second embodiments operates as follows.

Returning to FIG. 1, the reclining lever 3 (i.e., the inside and outside pivot shaft assemblies in rigid-connection by way of the connecting pipe 24 in the first embodiment, or the tube-like pivotal member 33 in the second embodiment) is normally biased to its spring-loaded position (the original position) in the counter-clockwise direction (viewing FIG. 1) by way of the bias of the springs 25, and engaged with the holder 23, so that the maximum counter-clockwise rotational movement of the reclining lever is restricted by way of the holder 23. Under such a released condition of the lever 3, as best seen in FIG. 4, the first sloped cam-edge portion 16a, the second sloped cam-edge portion 16b and the slightly raised intermediate cam-edge portion 16d of the cam-profile surface of the rotary cam (16A; 16B) are respectively engaged with and respectively brought into cam-contact with the up-sloped raised edge portion 14a, the down-sloped raised edge portion 14b and the locking-action cam-contour surface portion 14d of the cam-contour surface of each of the upper and lower toothed blocks 12A and 12B, by way of the counter-clockwise rotation of the pivotal shafts 4A and 4B (or the tube-like pivotal member 33 in the second embodiment). Owing to the counter-clockwise rotation of the pivotal shafts 4A and 4b (or the tube-like pivotal member 33 in the second embodiment), the upper and lower toothed blocks 12A and 12B move radially outwardly, while being guided by the two parallel side walls 9a and 9b within the recessed toothed-block guide 10. Thus, the outer toothed portions 13 of the toothed block pair (12A; 12B) are brought into meshed-engagement with the respective inner toothed portions (21a; 21a) of the arm 2 and also with the respective inner toothed portions (11a; 11b) of the base 1. With the reclining lever 3 and the pivotal shafts 4A and 4B (or the tube-like pivotal member 33 in the second embodiment) held at their initial positions (their spring-loaded positions), the reclining device is held in its completely-locked state where the relative rotational motion of the arm 2 to the base 1 is prevented by meshed-engagement between the toothed-block pair (12A; 12B) and the arm. Under the previously-noted completely locked state of the reclining device, the two opposing side walls 12a and 12b of each of the toothed blocks 12A and 12B is slidably fitted to the respective side walls 9a and 9b of the recessed toothed-block guide 10 in addition to the meshed-engagement between the outer toothed portions (13; 13) and the inner toothed portions (21a; 21a) of the arm 2 and the meshed-engagement between the outer toothed portions (13; 13) and the inner toothed portions (11a; 11b) of the base 1. In contrast to the above, for the purpose of shifting from the completely-locked state to the unlocked state, if the reclining lever 3 is pulled up and rotated in its clockwise direction against the bias of the spring, the rotary cam 16 rotates in the clockwise direction as seen in FIG. 5. The clockwise rotation of the rotary cam 16 causes the first sloped cam-edge portion 16a, the second sloped cam-edge portion 16b, and the intermediate cam-edge portion 16d of the cam-profile surface of the rotary cam 16 to be disengaged from the up-sloped raised edge portion 14a, the down-sloped raised edge portion 14b, and the locking-action cam-contour surface portion 14d of the cam-contour surface of each of the toothed co blocks 12A and 12B. Thereafter, the arm 2 becomes rotated counterclockwise, because the arm is permanently forced to the counterclockwise direction by means of the bias of the return spring 26. In conjunction with the counterclockwise rotation of the rotary cam 16, such counterclockwise rotational motion of the arm 2 produces a radially inward sliding motion or a contracted motion of the toothed-block pair (12A; 12B). In this manner, the outer toothed portions 13 of the toothed block pair are unmeshed from the inner toothed portions (21a; 21a) of the arm 2 and from the inner toothed portions (11a; 11b) of the base 1 by way of the clockwise rotation of the lever 3. The unmeshed state corresponds to the unlocked state of the reclining device. Under these conditions, the seat back can be adjusted toward a desired angular position. When the lever 3 is returned to the spring-loaded position with the seat back adjusted at the desired angular position, the rotary cam 16 rotates counterclockwise together with the lever 3. As a result, the toothed blocks 12A and 12B become slid radially outwards, and thus the outer toothed portions (13; 13) of the toothed blocks 12A and 12B are brought again into meshed-engagement with the inner toothed portions (21a; 21a) of the arm 2 and with the inner toothed portions (11a; 11b) of the base 1. In this manner, the angular adjustment of the seat back can be attained.

In the shown embodiments, a rotary-cam type reclining device employing a pair of diametrically-opposing two toothed blocks (12A; 12B) being in cam-connection with a rotary cam, is exemplified, it will be appreciated that the improved fitting structure of the invention may be applied to a rotary-cam type reclining device employing circumferentially equi-distant spaced three or more toothed blocks.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A double-sided reclining apparatus, comprising:
    a first reclining device equipped with a reclining-lever handle and a second reclining device, each of the first and second reclining devices comprising:
        a base adapted to be fixedly connected to a seat cushion;
        an arm adapted to be fixedly connected to a seat back and having a first toothed portion;
        a pivotal shaft through which said arm is rotatably supported on said base; and
        a cam and toothed blocks in cam-connection with each other, each of said toothed blocks having a second toothed portion meshable with and unmeshable from the first toothed portion, said cam and said toothed blocks cooperating with each other for causing meshed-engagement of the second toothed portion with the first toothed portion through a rotary motion of said cam in a first rotational direction to lock the reclining device, and for causing disengagement of the second toothed portion from the first toothed portion through a rotary motion of said cam in a second rotational direction opposed to the first rotational direction to unlock the reclining device; said cam and said toothed blocks have a plurality of cam-connection points in a cam-profile surface of said cam and a cam-contour surface of each of said toothed blocks;
    said double-sided reclining apparatus further comprising a connecting member through which said cam included in the first reclining device is mechanically linked to said cam included in the second reclining device;
    wherein said pivotal shaft is fitted into a central slot of said cam and has an irregular-shaped cross section to drive said cam, and a predetermined clearance is provided all around between an inner periphery of the central slot of said cam and an outer periphery of said pivotal shaft,
    wherein said pivotal shaft included in the first reclining device, said pivotal shaft included in the second reclining device, and said connecting member are integrally formed as a sole pivotal member in common to the first and second reclining devices, and
    wherein the sole pivotal member (33) comprises a pipe having a hollow cross section over the entire length thereof having the irregular-shaped cross section, and said pipe member has a plurality of longitudinally-extending external spline portions (35) formed on an outer periphery of said pipe member, and the central slot (16h) of said cam (16) has a plurality of key-grooved portions (37) respectively fined to the plurality of longitudinaly-extending external spline portions (35), while providing the predetermined clearance all around between The inner periphery of the central slot of said cam and the outer periphery of said pipe member.

2. A double-sided reclining apparatus, comprising:
    a first reclining device equipped with a reclining-lever handle an a second reclining device, each of the first and second reclining devices comprising:
        a base adapted to be fixedly connected to a seat cushion and defining therein a recessed toothed-block guide having a pair of parallel side walls;
        an arm adapted to be fixedly connected to a seat back and having a first toothed portion;
        a pivotal shaft through which said arm is rotatably supported on said base; and
        a cam and toothed blocks in cam-connection with each other, each of said toothed blocks slidably disposed between said base and said arm, and having a second toothed portion on an outer periphery thereof and a cam-contour surface on an inner periphery thereof, so that the second toothed portion is meshable with and unmeshable from the first toothed portion, while being slidably guided by the side walls of the recessed toothed-block guide, said cam and said toothed blocks cooperating with each other for causing meshed-engagement of the second toothed portion with the first toothed portion through a rotary motion of said cam in a first rotational direction to lock the reclining device, and for causing disengagement of the second toothed portion from the first toothed portion through a rotary motion of said cam in a second rotational direction opposed to the first rotational direction to unlock die reclining device, and said cam having a cam-profile surface facing the cam-contour surface of each of said toothed blocks; said cam and said toothed blocks have a plurality of cam-connection points in the cam-profile surface and the cam-contour surface for restricting a sliding motion of said toothed blocks in a sliding direction parallel to said side walls and for restricting a movement of each of said toothed blocks in a direction perpendicular to the sliding direction, when each of said toothed blocks is kept at an outermost sliding position where the second toothed portion is completly meshed with the first toothed portion;
    said double-sided reclining apparatus further comprising a connecting member through which said cam included in the first reclining device is mechanically linked to said cam included in the second reclining device;
    wherein said pivotal shaft is fitted into a central slot of said cam and has an irregular-shaped cross section to drive said cam, and a predetermined clearance is provided all around between an inner periphery of the central slot of said cam and an outer periphery of said pivotal shaft, wherein said pivotal shaft included in the first reclining device, said pivotal shaft included in the second reclining device, and said connecting member are integrally formed as a sole pivotal member in common to the first and second reclining devices, and wherein the sole pivotal member (33) comprises a pipe member having a hollow cross section being the same over the entire length thereof having the irregular-shaped cross section, and said pipe member has a plurality of longitudinadlly-extending external spline portions (35) formed on an outer periphery of said pipe member, and the central slot (16*h*) of said cam (16) has a plurality of key-grooved portions (37) respectively fitted to the plurality of longitudinally-extending external spline portions (35), while providing the predetermined clearance all around between the inner periphery of the central slot of said cam and the outer periphery of said pipe member.

* * * * *